United States Patent
Pacella et al.

(10) Patent No.: US 10,104,167 B2
(45) Date of Patent: Oct. 16, 2018

(54) NETWORKING FUNCTIONS IN A MICRO-SERVICES ARCHITECTURE

(71) Applicant: Verizon Patent and Licensing Inc., Arlington, VA (US)

(72) Inventors: Dante J. Pacella, Charles Town, WV (US); Mani Tadayon, Leesburg, VA (US); Syed A. Ahmad, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 256 days.

(21) Appl. No.: 14/867,223

(22) Filed: Sep. 28, 2015

(65) Prior Publication Data

US 2017/0093961 A1 Mar. 30, 2017

(51) Int. Cl.
| | |
|---|---|
| *G06F 15/16* | (2006.01) |
| *H04L 29/08* | (2006.01) |
| *H04L 29/06* | (2006.01) |
| *H04L 12/24* | (2006.01) |

(52) U.S. Cl.
CPC ...... *H04L 67/1002* (2013.01); *H04L 41/5025* (2013.01); *H04L 41/5051* (2013.01); *H04L 67/141* (2013.01); *H04L 69/16* (2013.01); *H04L 41/5077* (2013.01)

(58) Field of Classification Search
CPC ..... H04L 41/0806; H04L 45/04; H04L 45/44; H04L 47/782; H04L 49/70; H04L 12/4633; H04L 41/5054; H04L 47/825; H04L 63/0272; H04L 41/5025; H04L 41/5051; H04L 67/14
See application file for complete search history.

(56) References Cited

U.S. PATENT DOCUMENTS

| | | | | |
|---|---|---|---|---|
| 9,319,272 | B1* | 4/2016 | Brandwine | H04L 41/0806 |
| 9,503,391 | B2* | 11/2016 | Xia | H04L 47/782 |
| 9,813,379 | B1* | 11/2017 | Shevade | H04L 63/0272 |
| 2007/0097974 | A1* | 5/2007 | Ward | H04L 45/02 370/392 |
| 2012/0117248 | A1* | 5/2012 | Weis | H04L 45/04 709/227 |
| 2013/0185586 | A1* | 7/2013 | Vachharajani | H04L 45/44 714/2 |
| 2014/0201374 | A1* | 7/2014 | Ashwood-Smith | H04L 49/70 709/226 |
| 2015/0092551 | A1* | 4/2015 | Moisand | H04L 12/4633 370/235 |
| 2015/0271102 | A1* | 9/2015 | Antich | H04L 47/825 370/230 |
| 2017/0149632 | A1* | 5/2017 | Saltsidis | H04L 41/5054 |

* cited by examiner

*Primary Examiner* — Dustin Nguyen (57) ABSTRACT

A method may include receiving a request to provide at least one application session, and generating a networking architecture that includes at least one virtual route reflector front end (VRR FE), at least one back end work unit, and at least one routing information base (RIB) in a virtualization environment. The method includes implementing the at least one application session via the at least one VRR FE, the at least one back end work unit, and the at least one RIB. The at least one VRR FE is to perform as a proxy for traffic to the at least one back end work unit. The method also includes monitoring a load associated with the at least one application session, and performing load balancing on the networking architecture based on assignment of the load to the at least one back end work unit.

20 Claims, 8 Drawing Sheets

NETWORKING FUNCTIONS IN A MICRO-SERVICES ARCHITECTURE

BACKGROUND INFORMATION

Micro-services include a software architectural style of modular processes for complex applications. Micro-services architectures involve a modular approach to adding new features that groups related functions or groups by resource, allowing maximum efficiency in hyper scale due to separation of processes based on consumption of storage, input/output (I/O), memory and CPU resources. A single application is broken into a suite of smaller services, each running in its own process and communicating with lightweight mechanisms, often a Hypertext Transfer Protocol (HTTP) resource application programming interface (API). The services are grouped around business capabilities or functions and independently deployable by fully automated deployment machinery. Each set of services can employ different data storage technologies.

Network applications for micro-services, such as webscale applications, often face implementation difficulties. Webscale applications possess the ability to scale elastically with demand, even if the demand is far beyond the initial forecast by seamlessly adding memory, compute, storage, and networking resources without impacting the availability of the service or services. Webscale applications are currently implemented with distributed application models or similar modularized technologies, such as virtualization and Linux containers. Webscale applications require application aware sessions (and/or flow anchoring) based on load, mobility of the session (or flow), flow load-balancing, consolidation for shared memory, and hyper performance and scale, such as a No structured query language (NoSQL) non-relational databases. Webscale databases are designed with anticipation of data loss and administrators/database designers may weigh orders of magnitude performance gains (speed, volume, concurrency, non-transformation, etc.) over per-transaction latency and guaranteed transactions.

Current solutions for resilience may experience different issues in execution. Non-stop routing (NSR) paradigms in webscale architectures require the transmission control protocol (TCP) state (current window/sequence number) to be conveyed in instances in which a Border Gateway Protocol (BGP)/TCP session is moved. Each time a new feature is enabled, awareness of the features needs to be built into state synchronization mechanisms and this often leads to lagging of features. Other mechanisms may produce different issues, such as graceful restart (GR) in which true failures are required to wait for the GR timeout period before declaring a session down. Additionally, although many systems use proprietary schemes to load-balance routers within their own chassis or multi-chassis, there are currently no load-balancing mechanisms for network applications today across data centers.

DETAILED DESCRIPTION OF PREFERRED EMBODIMENTS

The following detailed description refers to the accompanying drawings. The same reference numbers in different drawings identify the same or similar elements. Also, the following detailed description is exemplary and explanatory only and is not restrictive of the invention, as claimed.

Systems and/or methods described herein may implement networking functions in a micro-services architecture. The micro-services architecture may reduce or eliminate three types of the implementation difficulties for monolithic networking functions. First, the micro-services architecture may dissemble and distribute monolithic network functions. Secondly, the micro-services architecture may distribute the sub-components of the network functions that require persistent sessions, without relying on persistent speakers. Finally, for large-scale network functions, the micro-services architecture may create hyperscale capabilities by independently scaling the sub-components.

The networking architecture may allow for conveyance of transmission control protocol (TCP) state (current window/sequence number) in instances in which a border gateway protocol (BGP)/TCP session is moved. The systems may provide load balancing for network applications across multiple compute nodes (or data centers). Further, the networking architecture may allow network applications, such as BGP and BGP sessions, to be loaded into a containerized virtualization environment and to be treated in a similar manner to any other hyperscale applications (e.g., a Web 2.0 application). Although embodiments are described with respect to BGP, the networking architecture may be applied to other network applications, such as firewalls, etc.

The networking architecture may include multiple virtual route reflector front ends (VRR FEs), back end work units (e.g., BGP speakers), a central processes component, routing information bases (RIBs), a resilient (or persistent) storage component (e.g., a shared routing database) and an administration processes component. The systems may allow applications to relocate a control plane (or a portion of the control plane) of an application into a shared space that hosts multiple control planes. The networking architecture may allow applications to decouple application sessions from particular physical hardware. The networking architecture may also support load balancing of application sessions, multithreading, and load balance multithreading. Further, the networking architecture may allow applications to enroll into a hyperscale (e.g., no SQL) database structure or memory cache and to share memory across multiple different concurrent sessions.

Figure 1:
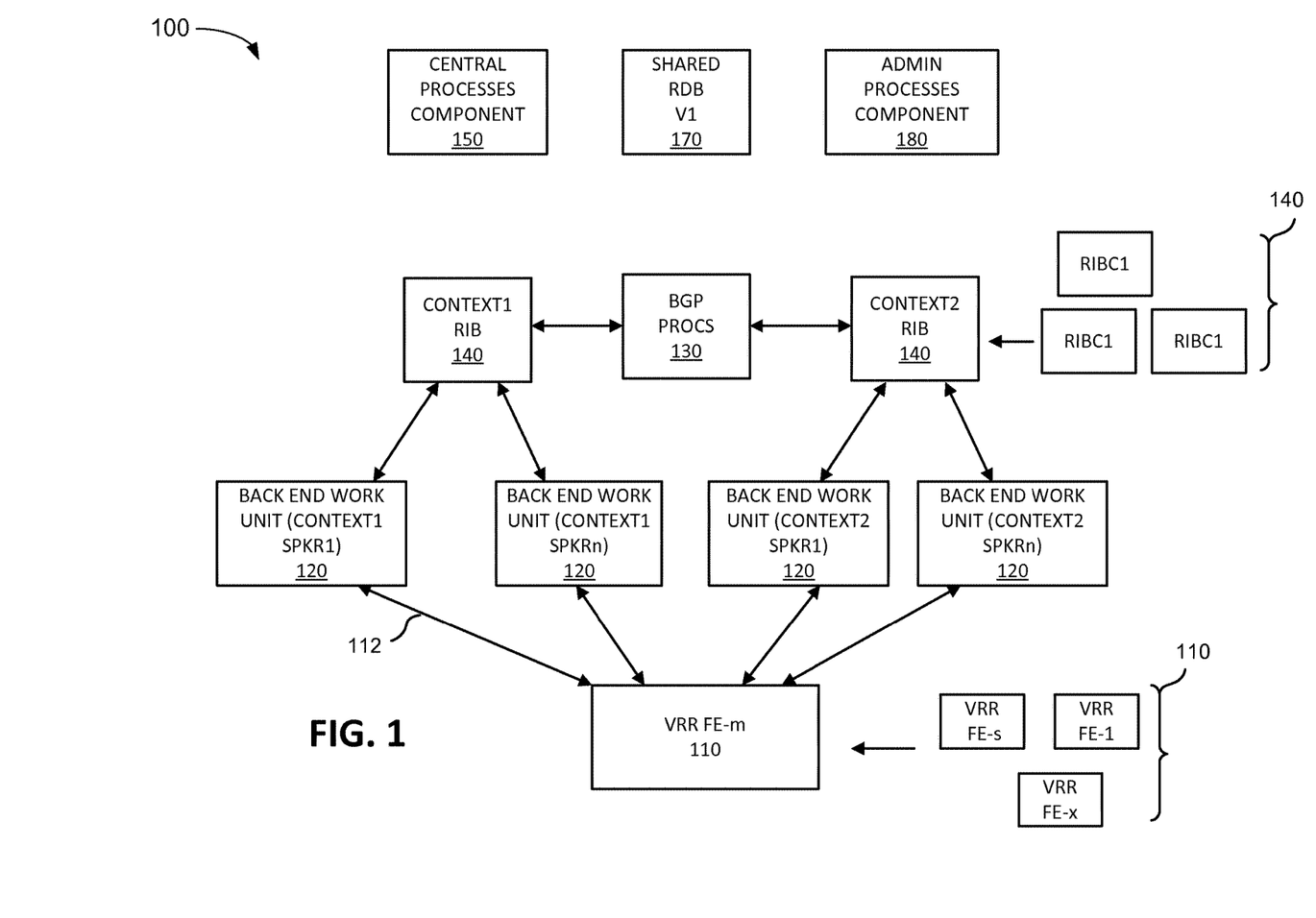
FIG. 1 is a diagram illustrating a containerized virtualized environment for micro-services for network applications according to an implementation described herein.

FIG. 1 is a diagram of an exemplary networking architecture for a system 100 in which the systems and/or methods described herein may be implemented. As shown in FIG. 1, networking architecture (or system) 100 may include virtual route reflector front ends (VRR FEs) 110, back end work units 120 (shown in FIG. 1 as Context1 speaker 1-to-n and Context2 speaker 1-to-n in a context and speaker architecture), a BGP processes component 130, routing information bases (RIBs) 140, a central processes component 150, a resilient storage component 170 and an administration processes component 180. Four VRR front ends 110, four back end work units 120, a single BGP processes component 130, five RIBs 140, a single central processes component 150, a single resilient storage component 170 and a single administration processes component 180 have been illustrated in FIG. 1 for simplicity. In practice, there may be more or fewer devices or components. As shown in FIG. 1, system 100 represents a single route processor in which each component (e.g., virtual route reflector front ends (VRR FEs) 110, back end work units 120, RIBs 140, central processes component 150, resilient storage component 170 and/or administration processes component 180) may run on a separate or shared node in a datacenter. Components of system 100 may be distributed across multiple different physical machines in the datacenter. Additionally, components of networking architecture 100 may be distributed across multiple datacenters.

Although a networking architecture for a system 100 that comprises a VRR is shown, similar networking architectures may be implemented for other network systems and/or devices to dissemble and distribute monolithic network functions, distribute the sub-components of the network functions that require persistent sessions, without relying on persistent speakers, and create hyperscale capabilities by independently scaling the sub-components for large-scale network functions. For example, although the system 100 shown in FIG. 1 may allow implementation of a routing daemon as a micro-service, the router that is implemented in this model may be deployed in any number of different roles other than as a VRR, such as a route server, a looking glass server, a topology analyzer, a tunnel concentrator/aggregator and container bridging service, etc.

Another implementation may include a dedicating process for a specified set(s) of flows. In the instance of a VRR in which the flows are associated with a BGP sessions, each or some set of BGP sessions may terminate on a targeted process. This dedicating process may be used to distribute the load and to serve as a mechanism to deploy upgrades (e.g., for testing of features sets with limited exposure).

System 100 may be described in relation to Linux containers. System 100 may allow virtualization of the components of each route processor to enhance scale (or ability to adapt scale) and resiliency of the application. Each component may run (or be executed) on different (or same) nodes depending on resiliency requirements and available resources. For example, in instances in which the network administrator requires enhanced resiliency the network architecture 100 may execute a first route speaker (e.g., speaker version 1) on a separate node of the data center from another route speaker (e.g., speaker version 2) whereas in other instances, such as parallel processes, the speakers may be executed on a same node.

VRR FE 110 may maintain high-level application awareness for the application (e.g., VRR FE 110 may monitor routes, processes and devices and/or record session characteristics for a BGP session). A route reflector may be a BGP router configured to reflect routing information to a group of client BGP routers. VRR FE 110 may forward the route advertisement to all its client routers via internal BGP (IBGP). VRR FE 110 may encapsulate data or perform as a proxy for traffic to back-end components (e.g., back end work units 120, central processes component 150, shared memory 140, shared routing database 170 and administration processes component 180) using an internal (underlay/overlay) network, as described below with respect to FIG. 3. VRR FE 110 is a particular implementation of a front end work unit in a micro-services architecture. In other embodiments of the micro-services architecture (e.g., route server, looking glass server, etc.), the front end work units may perform functions, including performing as a proxy for traffic, based on particular features of the application in conjunction with other components of that particular application (e.g., front end work units in a route server, topology analyzer, etc.).

VRR FEs 110 may be arranged as a distributed application front end for the BGP application and sessions. VRR FEs 110 may manage distribution based on a hierarchy of designated VRR FEs 110 including a master (shown in FIG. 1 as VRR FE-m (master VRR FE)), a successor (shown in FIG. 1 as VRR FE-s (successor VRR FE)), and eligible successors (shown in FIG. 1 as VRR FE-e-1 to VRR FE-e-x) among "n" number of virtual application-aware VRR FEs 110. The master VRR FE-m 110 and successor FE-s VRR 110 may maintain TCP state across all clients; however, state maintenance in network architecture 100 may be limited to double state maintenance (i.e., state maintenance for the master and the successor VRR FEs 110). System 100 may support as many (i.e., multiple) instances of the VRR FEs 110 as required. Each VRR FE 110 may execute on a CPU blade n the data center (e.g., a multicore multi-CPU computation blade in a multi-CPU shelf).

An overlay network (not shown) may be implemented to connect the front end (and system 100) to other systems, networks and/or devices based on multiple types of overlay, such as an internal application overlay to provide continuity to component services. Alternatively, a bridging overlay to provide reachability from the front end to other instances outside the data center. In another alternative the overlay network may be implemented as an application-level overlay, such as an internet protocol security (IPSec) tunnel, which is part of an external or product service specification.

Although front end processing is described with respect to virtual route reflectors, the principles described herein may be applied to networking architecture for other applications, such as firewalls. For example, a front end node in a firewall may receive a flow and perform a flow examination to determine whether the flow is a new flow or a known flow. In instances in which the flow is a known flow, the front end node may then access information to determine which back end work unit 120 that it had pinned the flow. If the flow is a new flow, the front end node may then analyze the load on other flows and determine the optimal manner to distribute to least busy flow processing node.

Back end work units 120, such as BGP speakers, may handle application, per-session input/output (I/O), encapsulation/de-encapsulation for the overlay network, communication of status to VRR FE 110 directly or through administration processes component 180, etc., such as described below with respect to FIG. 4. BGP speakers may include a set of BGP sessions that are pinned to (i.e., assigned and executed by) a route processor. Back end work units 120 may send information (shown by arrows 122) to a particular routing information base (e.g., Context 1 RIB in a hub and spoke configuration). Because many different instances of a particular application (e.g., VRR) may be run simultaneously (each serving a different set of customers/different purpose/different geographic region), each of those instances may be considered a separate context. For example, a context may comprise a HUB.

Although back end work units are described with respect to BGP speakers for clarity, the principles described herein may be applied to networking architecture for other applications, such as firewalls. Back end work units 120 in a networking architecture for a firewall application may include flow processing nodes that operate according to a particular security rule set. The designation of the back end may be based on any business or functional logic.

BGP processes component 130 may manage BGP routing protocol and other processes. BGP processes component 130 may perform BGP best path selection processes. For example, BGP processes component 130 may exchange routing and/or reachability information using IBGP.

Central processes component 150 may handle (i.e., manage, monitor and control) central processes which may be required to be centralized on a per-process or per-task basis for each particular application, such as described herein below with respect to FIG. 5.

RIB 140 may include shared memory that uses indirection/indices to simplify data into pointer records for faster fault convergence and large-scale topology/database changes in instances in which only a portion of the record needs to be updated, such as described with respect to FIG. 6 herein below. RIB 140 is a particular implementation of an application-wide shared memory instance. In other embodiments of the micro-services architecture (e.g., route server, looking glass server, etc.), back end work units (or other components of a micro-services architecture) may storage application information in the application-wide shared memory instance in a virtualization environment.

Shared routing database 170 (or a resilient storage component) may allow information from the application to be written into a database for longer term (with respect to storage times in RIB 140) reconciliation between processes or for inter-process/interdependence resolution. Shared routing database 170 may also be used for process debugging, counter and event logging. Shared routing database 170 may include a web storage database or webscale database, such as Cassandra™, Mongo database or a no-SQL type distributed database that may store information that requires longer persistence (i.e., long term storage). RIB 140 and shared routing database 170 may allow the sharing of memory across different sessions in network architecture 100.

Administration processes component 180 may manage and control administration processes including coordinating software updates for the system, providing scalable and sandboxed remote user interaction with the overall system, etc., as described below with respect to FIG. 7.

According to an embodiment, system 100 may allow separation of a BGP session from a single TCP connection into different components. System 100 may ensure enhanced reliability/mobility of the external facing session(s) based on recording of session information and portability of the session to other components in instances in which utilized components fail. In addition, system 100 may allow load-balancing for network applications across nodes or data centers. System 100 may allow micro-services for network applications to be separated from the hardware and put into a shared space (e.g., a datacenter) that hosts multiple control planes. System 100 may allow micro-services for a network application to be moved into a web paradigm or data center. System 100 may allow sessions to persist for as long as an outer or foreign client can reach the data center in which system 100 is hosted.

In implementations described herein, the networking architecture may disembody a virtual route reflector into multiple elements or components which may be hosted on separate CPUs or, in some instances, may share CPUs. The multiple elements may be connected by inter processor communication (IPC). In contrast to a current VRR/TCP handler and session distribution mechanism, in which the entire router is hosted on a single compute node (and may be totally inoperable if the device fails), system 100 may allow elements or components to run on separate nodes or hardware.

In instances in which a computing node is lost, the networking architecture may lose a particular aspect of the router (or other application or machine) and may be able to replace the component that was hosted on the computing node based on information stored elsewhere in system 100. There is no direct tie in (i.e., dependence or requirement) between a specific application instance and the physical node as the key data components are hosted and replicated in a memory space other than the application component (i.e. the VRR back end). In this instance, the networking architecture 110 allows the system to maintain BGP sessions even in instances in which the particular server (e.g., the initial server hosting the application) being accessed is unavailable. System 100 may include components that may be generated or removed on an as needed basis (e.g., deleted or erased) as conditions occur.

Although FIG. 1 shows exemplary components of system 100, in other implementations, system 100 may include fewer components, different components, differently arranged components, or additional components than depicted in FIG. 1. For example, system 100 may include other components not shown, such as a local RIB, RIB out, BGP resolvers and interior gateway protocol (IGP) processors. Additionally, or alternatively, one or more components of system 100 may perform functions described as being performed by one or more other components of system 100.

Figure 2:
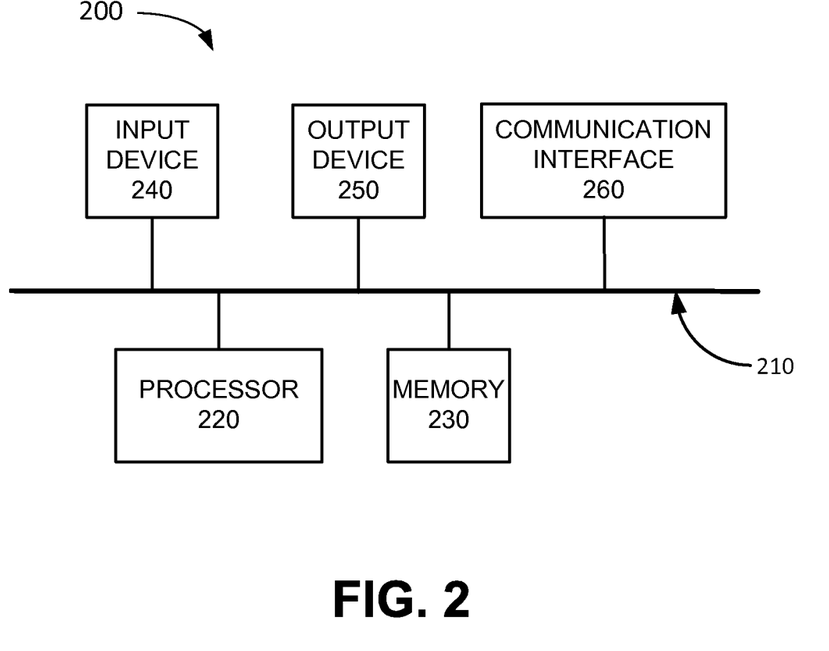
FIG. 2 is a diagram illustrating exemplary components of the virtual machine system of FIG. 1.

FIG. 2 is a diagram illustrating exemplary components of a device 200 (or devices) that may host system 100. As shown in FIG. 2, device 200 may include a bus 210, a processor 220, a memory 230, an input device 240, an output device 250, and a communication interface 260.

Bus 210 may include a path that permits communication among the components of system 100. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Although input device 240 and output device 250 are shown, the input and output of system 100 may be through any device/API/protocol communication/or protocol enhancement.

Input device 240 may allow an operator to input information into system 100. Input device 240 may include, for example, a keyboard, a mouse, a pen, a microphone, a remote control, an audio capture device, an image and/or video capture device, a touch-screen display, and/or another type of input device. In some embodiments, system 100 may be managed remotely and may not include input device 240. In other words, system 100 may be "headless" and may not include a keyboard, for example.

Output device 250 may output information to an operator of system 100. Output device 250 may include a display, a printer, a speaker, and/or another type of output device. For example, device 200 may include a display, which may include a liquid-crystal display (LCD) for displaying content to the operator. In some embodiments, system 100 may be managed remotely and may not include output device 250. In other words, device 200 may be "headless" and may not include a display, for example.

Communication interface 260 may include a transceiver that enables system 100 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

As described herein, device 200 may perform certain operations in response to processor 220 executing machine-readable instructions contained in a computer-readable medium, such as memory 230. A computer-readable medium may be defined as a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processor 220 to perform processes described herein. Alternatively, hardwired circuitry may be used in place of or in combination with machine-readable instructions to implement processes described herein. Thus, implementations described herein are not limited to any specific combination of hardware circuitry and software.

Figure 3:
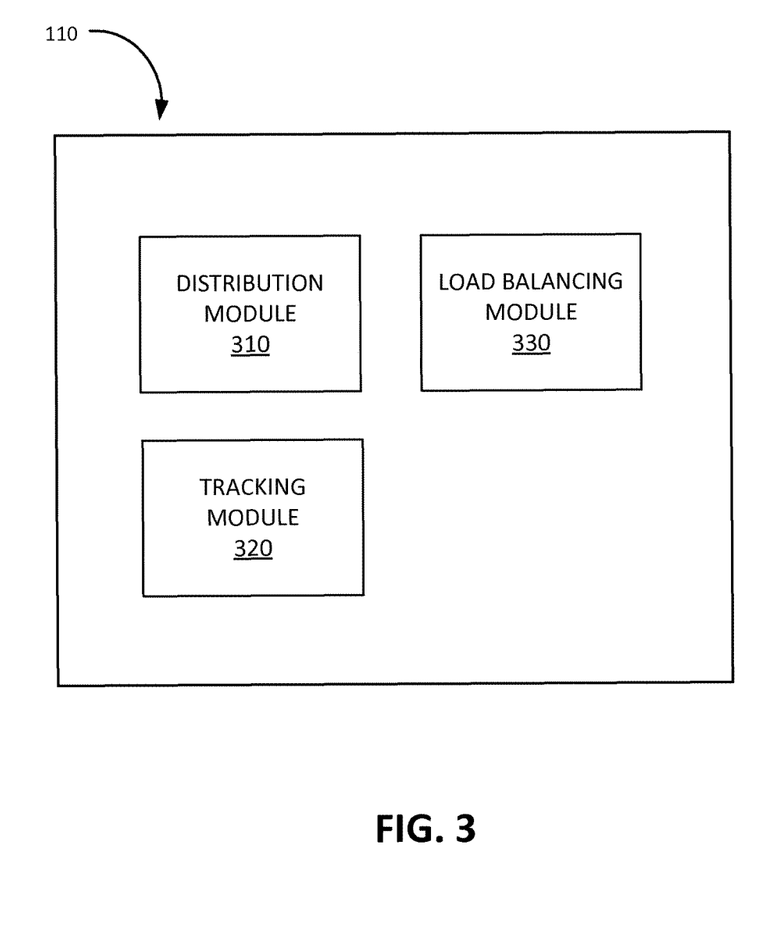
FIG. 3 is a diagram illustrating exemplary functional components of the virtual route reflector front end (VRR FE) of FIG. 1.

FIG. 3 is a diagram illustrating exemplary functional components of a VRR front end 110. As shown in FIG. 3, VRR FE 110 may include a distribution module 310, a tracking module 320, and a load balancing module 330. In some implementations, the functional components of VRR FE 110 may be implemented, for example, via processor 220. Alternatively, some or all of the functional components of processor 220 may be implemented via hard-wired circuitry.

VRR FE 110 may include high-level application awareness (i.e., monitoring of session characteristics). VRR FE 110 may separate each BGP session from a single particular TCP session. VRR FE 110 may also encapsulate or proxy traffic to back-end nodes using an internal (underlay/overlay) network. The VRR FE 110 may perform as a proxy for an application-aware load-balancer or pinning loads per divisible unit. VRR FE 110 may perform other services, such as internet protocol version 4 (IPv4) to internet protocol version 6 (IPv6) translation, SSL offload, IPSec termination, etc. VRR FE 110 may perform proxy function for the routing sessions between the clients and the VRR. VRR FE 110 may serve a delegation function to de-couple the BGP routing session from the TCP session. VRR FE 110 may write the TCP session state to a resilient memory structure that helps maintain TCP session state in particular instances. For example, VRR FE 110 may write the TCP session state to the resilient memory structure if the FE component experiences fault (up to and including termination of the FE component process), if the FE component is scaled horizontally, if the FE component is replicated for purpose of migration to a different hardware component or if the FE component is replicated for purpose of software upgrade.

Network applications may require per-flow: per-node association, however network architecture 100 (and VRR FE 110) may allow sessions to be mobile between the nodes. VRR FE 110 may deterministically and dynamically associate a flow/session with a back end node (e.g., a selected back end work unit 120).

Distribution module 310 may manage distribution based on designation of a master, successor, and eligible successor VRR FEs 110 among "n" number of virtual application-aware VRR FEs 110. The master VRR FE-m 110 and successor VRR FE-s 110 may maintain TCP state across all clients (that receive BGP routing), but may only require state maintenance for the two active VRR FEs 110. TCP transport sessions may be bundled for "n:n" TCP:BGP session pairings, which may lead to head-of-line blocking. However, this performance hindrance may be offset (and significantly outweighed) by gains of scale, overall reliability and front-end simplicity. Bundling of the TCP session may result in a lower load (and/or application instance) as compared to the currently available systems.

Distribution module 310 (in a VRR FE-m 110 that has been designated as the master VRR FE 110) may maintain TCP state across all VRR FEs 110. In an instance in which there are a particular number of front end VRRs 110 (e.g., a number N front end VRRs 110), each may have multiple TCP sessions.

Distribution module 310 may manage flow control using bundled TCP in a similar manner to quick UDP Internet connections (QUIC)/SPDY™. Alternatively, distribution module 310 may manage flow control using in-application flow control by having the application track sequence numbers (state) and run over stateless user datagram protocol (UDP)/QUIC. Distribution module 310 may enable TCP sessions to run disjointed from the main speaker. Further performance improvements by moving to SPDY or QUIC may be implemented. Load distribution may occur using any of the existing criteria such as hashing, grouping, round-robin distribution, etc.

Distribution module 310 may run multiple TCP sessions that act as a bundle (i.e., single TCP session). BGP application session (or other protocol relying on TCP-based communication) may use any TCP session by pinning the stream of messages to that TCP session for the lifetime of the session. Another stream of messages from the same BGP application may use a second member session of the TCP bundle. For example, BGP application can send an update on member session with an arbitrary ID of 1. BGP application may send a message to keep the session (keepalive) on session ID 2. Keepalive tracks reachability to the host and not a fixed interface and any session is sufficient as long as messages are received. Under TCP bundling, tracking module 320 must be invoked.

Alternatively, UDP may be used without needing TCP sequence number tracking In instances in which UDP is used, an application would need to use separate application-level sequencing to ensure all messages are received.

Tracking module 320 (in the master VRR FE-m 110) may be required (i.e., may be responsible) to obtain a most recent sequence number from each external client, thus effectively performing a database management function. Tracking module 320 may send the sequence numbers to the successor VRR FE-s 110. Tracking module 320 may mirror TCP state to the successor VRR FE-s 110 without error checking. Tracking module 320 may track each session with an identifier (e.g., for session 101 a sequence number may be 1500). Tracking modules 320 in VRR FE-m 110 and VRR FE-s 110 may each track separate instances of TCP session.

Tracking module 320 may track BGP sessions for back end work units 120 (e.g., HUB speakers). Tracking module 320 may ensure that in instances in which a node that hosts a component becomes inoperative (i.e., goes down), no data is lost when the component is replaced.

Load balancing module 330 may perform load balancing for the session to back end work units 120. Load balancing module 330 may control a number of sessions per speaker (or back end work unit 120). In some instances, load balancing module 330 may assign a single session to each speaker. In other instances, load balancing module 330 may assign multiple (e.g., one hundred or two hundred) sessions to a speaker. Load balancing module 330 may analyze factors such as the level of resources that each session is taking up from a compute node, level of usage of storage resources, the amount of traffic back and forth per session, the overall amount of raw data, etc. Load balancing module 330 may analyze the load across computing nodes for the back end work units 120 based on these factors and balance the loads to optimize utilization of resources across the number of speakers and computing nodes.

Load balancing module 330 may provide load balancing for network applications across data centers. In contrast to many proprietary mechanisms that load-balance within their own chassis or multi-chassis, pin flows and require state maintenance to recover without loss, load balancing module 330 may allow load balancing outside of a chassis or multi-chassis without pinning flows to a particular node. Additionally, the load balancing module 330 may support the continued functioning of the application in instances in which a central task fails or hangs. Load balancing module 330 may also prioritize flows/sessions/packets, encapsulation/decapsulation for application overlays, as described earlier, such as secure sockets layer (SSL) or IPSec, and convert technologies, such as IPv4 to IPv6, or other such protocol suites.

Figure 4:
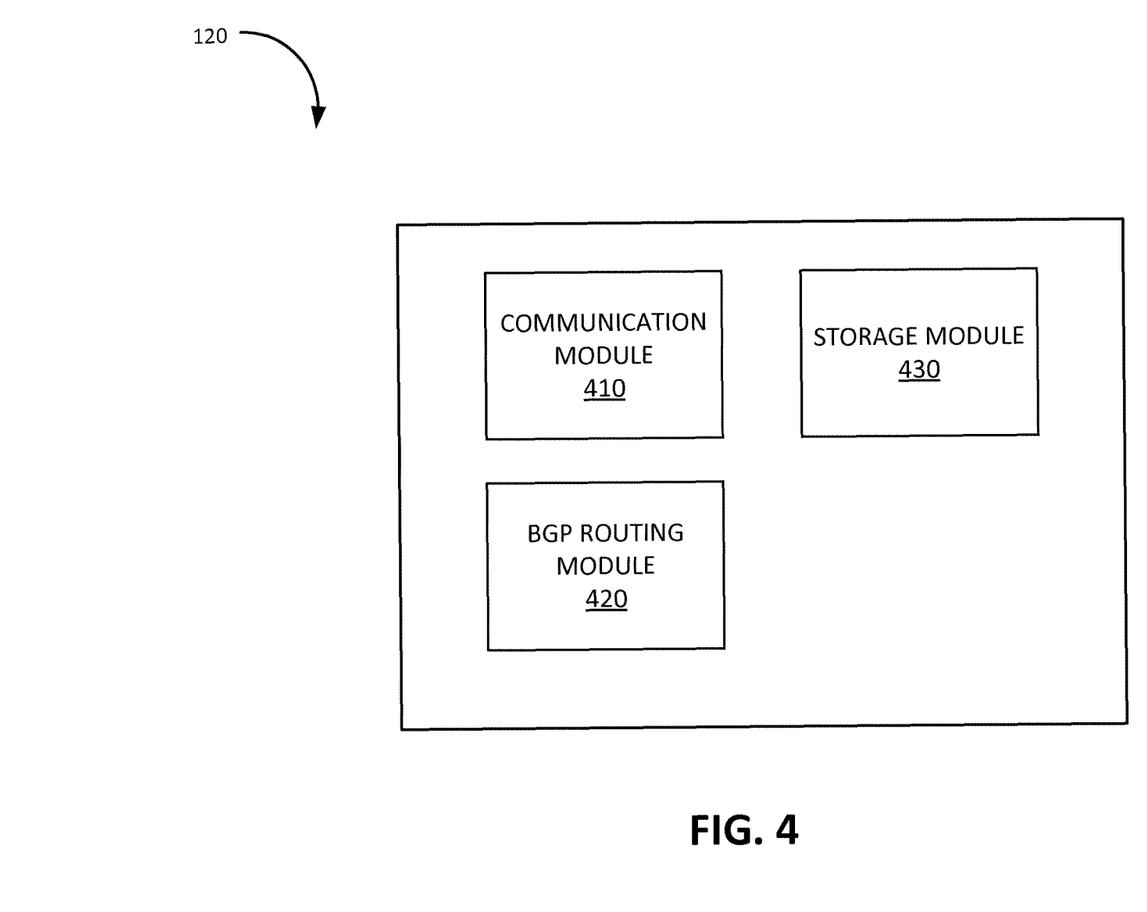
FIG. 4 is a diagram illustrating exemplary functional components of the back end work unit of FIG. 1.

FIG. 4 is a diagram illustrating exemplary functional components of back end work unit 120. As shown in FIG. 4, back end work unit 120 may include a communication module 410, a BGP routing module 420 and a storage module 430. In some implementations, the functional components of back end work unit 120 may be implemented, for example, via processor 220. Alternatively, some or all of the functional components of back end work unit 120 may be implemented via hard-wired circuitry.

Communication module 420 may handle application, per-session I/O, encapsulation/decapsulation for the overlay network. Communication module 420 may communicate status to VRR FE 110s directly or through admin container (e.g., via administration processes component 180). Communication module 420 may communicate with central processes for the application (e.g., via central processes component 150).

BGP routing module 420 may handle BGP route processing as a client of a particular VRR FE 110. Routing module 420 in conjunction with VRR FEs 110 may maintain consistency of session for BGP speakers over TCP. Routing module 420 may maintain a one to one correspondence between the BGP application session and associated TCP transport session of the BGP application session. BGP routing module 420 may perform processes that are typically run on individual computers on a virtualized component within the data center.

Storage module 430 may perform read/write (R/W) of shared memories, and R/W of resilient (or persistent) data (long-term storage). Storage module 430 may also perform message integrity error handling and insulate central processes from a majority of corruption/overflow events.

Application sessions, such as BGP sessions, may be required to be persistent. Back end work units 120 in conjunction with VRR FEs 110 may ensure that processes may be terminated at a particular node and spun off on another node in which the process may be restarted at a position where the previous process left off. In instances in which a TCP session is lost, VRR FE-m 110 may maintain the session and ensure that BGP session is not lost. In instances in which a speaker handling the session is terminated, another speaker may pick up the session state from the memory, thereby preventing session loss.

According to another embodiment, VRR FE 110 may track packets and keep BGP and TCP sessions coupled with each other. VRR FE 110 may maintain affinity and each BGP speaker (back end work unit 120) may write the state of its session (BGP state) to a RIB 140 (e.g., HUB1 RIB). Back end work units 120 may store the state of transportation information in RIB 140. Alternatively, back end work units 120 may write to another designated database cluster to avoid overburdening the particular RIB 140 with which it is associated. The designated database cluster (not shown) may perform a singular function of maintaining a database of TCP session.

Figure 5:
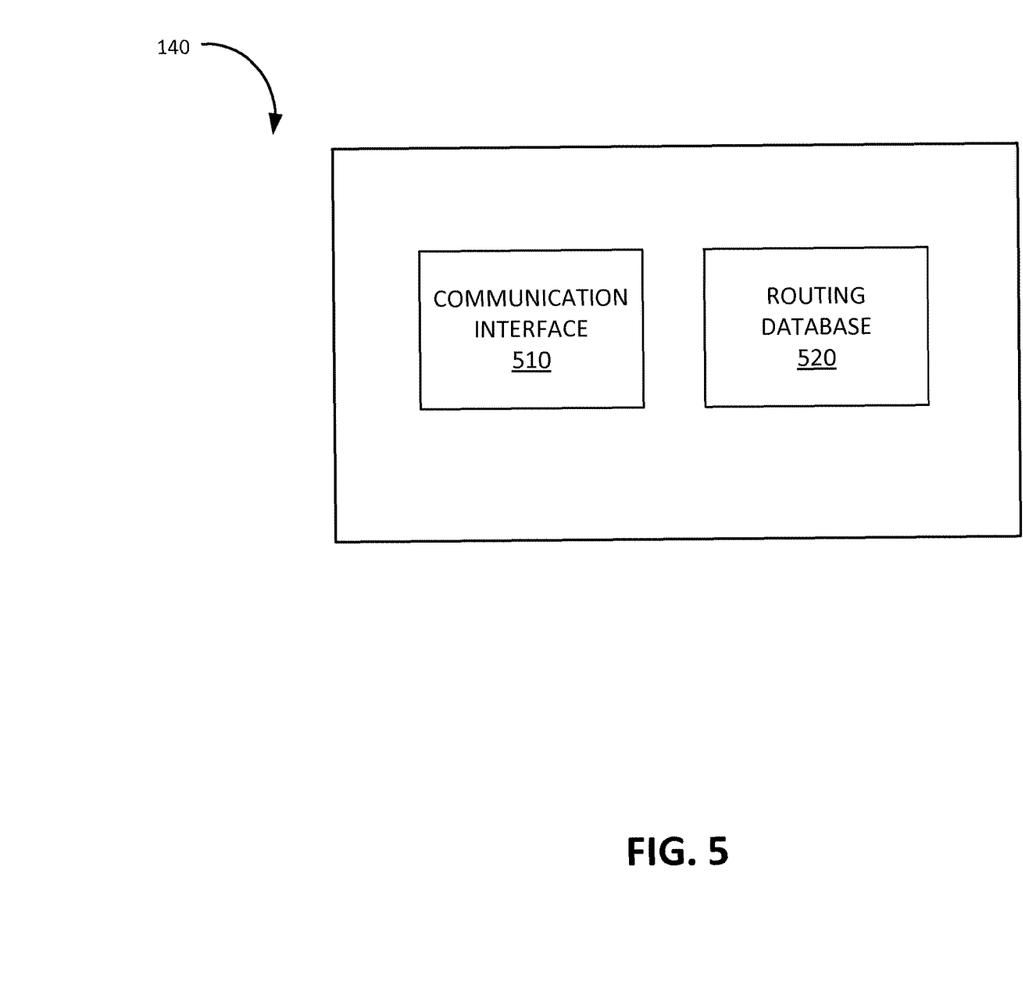
FIG. 5 is a diagram illustrating exemplary functional components of the routing information base (RIB) of FIG. 1.

FIG. 5 is a diagram illustrating exemplary functional components of the RIB 140 of FIG. 1. In some implementations, the functional components of RIB 140 may be implemented, for example, via processor 220 executing instructions from memory 230. Alternatively, some or all of the functional components of RIB 140 may be implemented via hard-wired circuitry. As shown in FIG. 5, RIB 140 may include a communication interface 510, and a routing database (DB) 520.

Communication interface 510 may receive common information from distributed processes that can be shared, significantly lowering the memory requirement when increasing the number of speakers. These distributed processes may not be iterated for each back end work unit 120 (i.e., BGP speaker)). In some embodiments, communication interface 510 may invoke NoSQL data structures. Communication interface 510 may allow shared memory use indirection/indices to simplify data into pointer records for faster fault convergence and large-scale topology/database changes when only a portion of the record needs to be updated.

Routing DB 520 may store the routing information received from back end work units 120. For example, routing DB 520 may include tables that store routing information for each application session. Routing DB 520 may provide shared memory that saves resources as the number of back end work units 120 and corresponding requirement for routing information increases. Similar routes may be sent to a common store and read from the common store without requiring replication of storage for each similar route. Routing DB 520 may centralize all common RIB information and allow any speaker to send out on a particular session that includes suitable (corresponding) route information.

Figure 6:
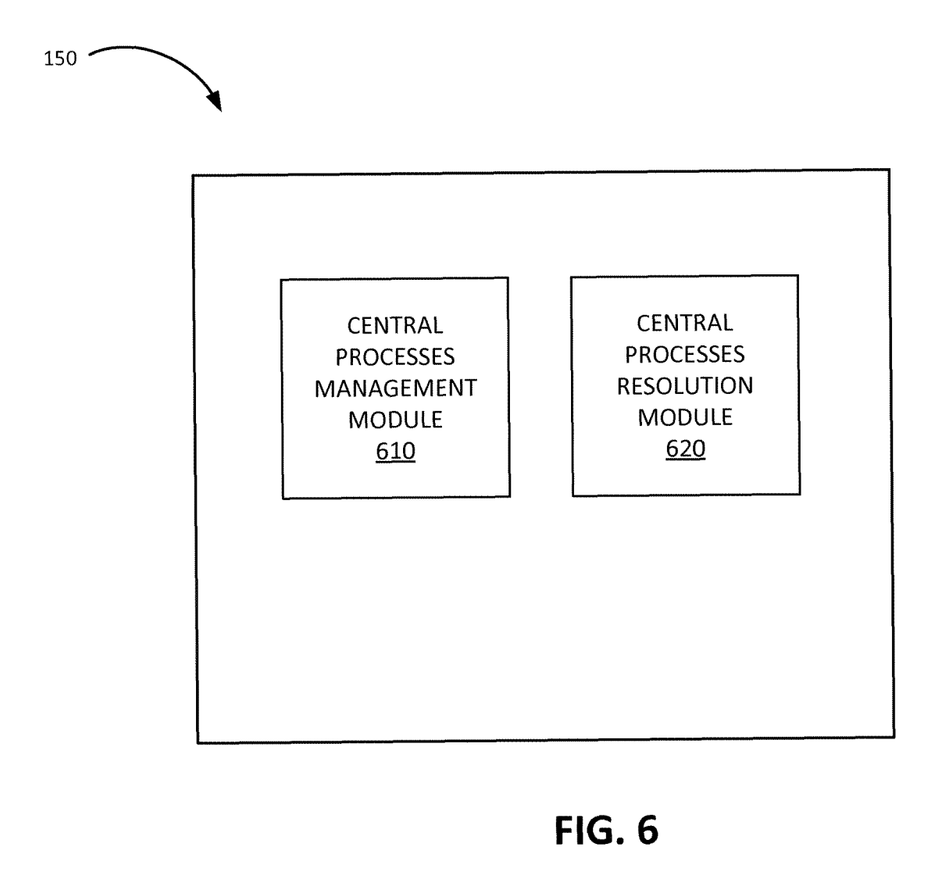
FIG. 6 is a diagram illustrating exemplary functional components of the central processes component of FIG. 1.

FIG. 6 is a diagram illustrating exemplary functional components of the central processes component 150 of FIG. 1. In some implementations, the functional components of central processes component 150 may be implemented, for example, via processor 220 executing instructions from memory 230. Alternatively, some or all of the functional components of central processes component 150 may be implemented via hard-wired circuitry. As shown in FIG. 6, central processes component 150 may include a central processes management module 610, and a central processes resolution module 620.

Central processes management module 610 may handle (i.e., manage, monitor and control) central processes which may be required to be centralized on a per-process or per-task basis for each particular application. Central processes management module 610 may also manage central processes that may be scaled out or be multi-processed.

Central processes resolution module 620 may resolve routes for client back end work units 120 and VRR FEs 110. Central processes resolution module 620 may also resolve oscillation between distributed processes, process inbound data from distributed processes (RIB-in) and prepare outbound data for the distributed processes (RIB-out). The resolution of the oscillation may be based on a number of factors, such as credibility of the source. The credibility is configurable and may be established in different ways. For example, a speaker with fewer route oscillations may be defined as more credible than one with higher oscillation or, in other cases, a speaker with more total routes may be considered more credible. Additionally, a central arbitrator may also enforce route dampening to reduce the churn resulting from oscillation.

Figure 7:
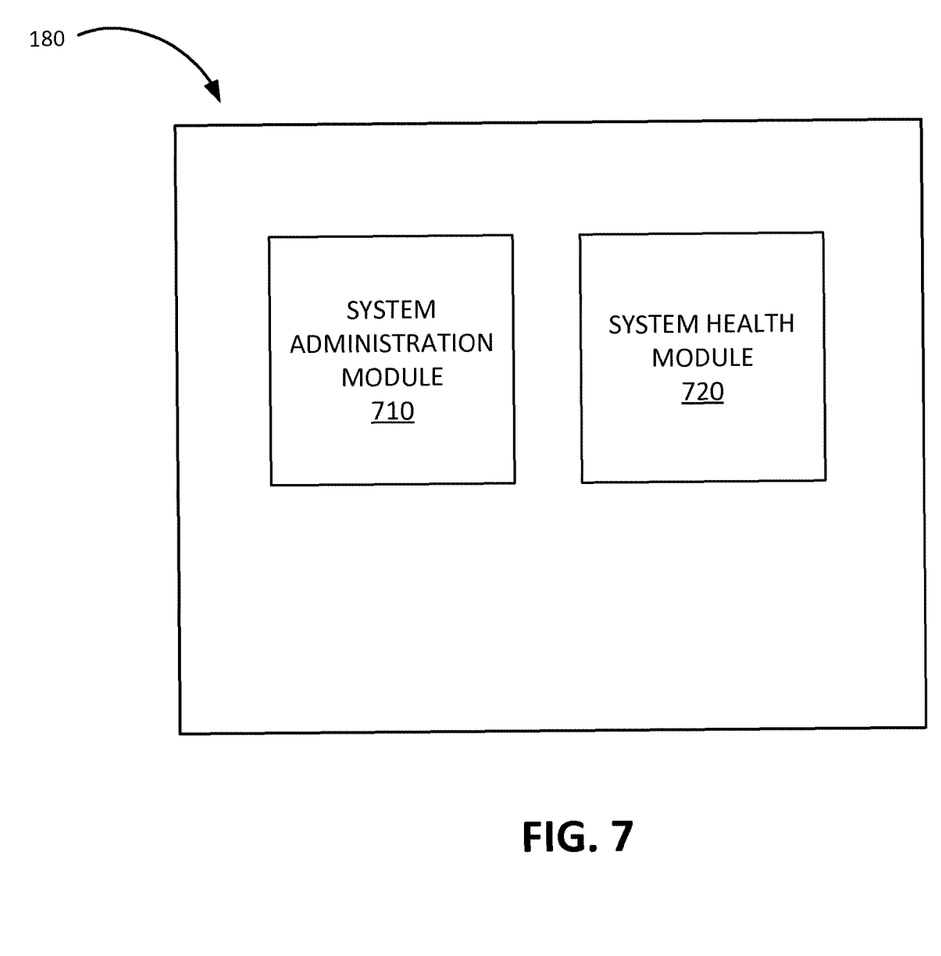
FIG. 7 is a diagram illustrating exemplary functional components of the administration processes component for network applications of FIG. 1.

FIG. 7 is a diagram illustrating exemplary functional components of the administration processes component 180 for network applications. As shown in FIG. 7, administration processes component 180 may include a system administration module 710, and a system health module 720. In some implementations, the functional components of administration processes component 180 may be implemented, for example, via processor 220. Alternatively, some or all of the functional components of administration processes component 180 may be implemented via hard-wired circuitry.

System administration module 710 may coordinate software updates for the system. For example, system administration module 710 may provide upgrades of machine readable instructions (i.e., software code) for speaker containers (i.e., back end work units 120). System administration module 710 may provide scalable and sandboxed remote user interaction with the overall system. System administration module 710 may also perform support processes to control a number of back end work units 120 by deleting or generating back end work units 120 as required and scaling the overall system. System administration module 710 may receive most queries (or management traffic hits) to handle internal request. For example, VRR FE-m 110 may send a message that it is receiving a request to show how many routes are received on HUB 1 speaker 1 and system administration module 710 may communicate with the container (HUB 1 speaker 1) and convey the information to the requesting entity about the number of routes.

System health module 720 may perform per-node status/ health checks and track overall system health (e.g., errors in system, processor speeds, capacity, etc.). System health module 720 may convey status and location between nodes/ components in addition to information about security credentials (e.g., rotating security credentials).

Figure 8:
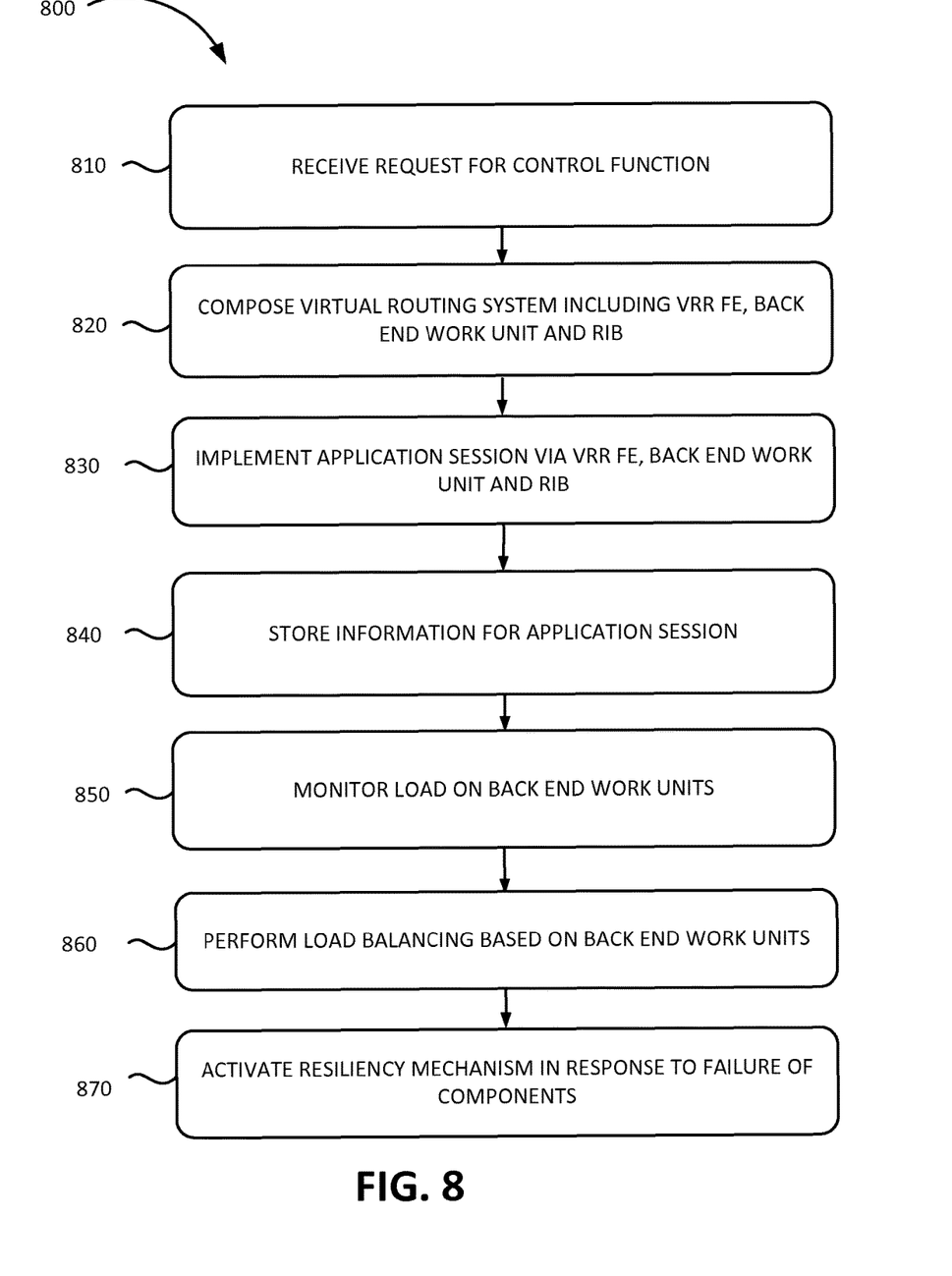
FIG. 8 is a flowchart of an exemplary process performed by a networking architecture for micro-services according to an implementation described herein.

FIG. 8 is a flowchart of an exemplary process performed by a networking architecture for micro-services with respect to a BGP application according to an implementation described herein. In some implementations, the process of FIG. 8 may be performed by one or more components of system 100. In other implementations, some or all of the process of FIG. 8 may be performed by another device or a group of devices separate from or including one or more components of system 100. Furthermore, in other implementations, the process of FIG. 8 may include fewer blocks, additional blocks, different blocks, or differently arranged blocks.

At block 810, one or more components of system 100 (e.g., via an orchestration layer (not shown) associated with system 100) may receive notification (or a request) for a control (plane) function. For example, system 100 may be initiated in response to a request for a BGP session.

The orchestration layer of system 100 may activate VRR FE-m 110 and generate a minimum number of components (e.g., VRR FEs 110, back end work units 120, and/or RIBs 140) to service the request at block 820. System 100 may compose a virtual routing system of components hosted on different nodes to support load sharing for route processes and resiliency levels. For example, a single VRR FE 110, a single back end work unit 120, a single RIB 140, etc., may be generated based on invocation of the control function. VRR FE-m 110 and other components of system 100 may be generated as containers (e.g., Linux), virtual machines or native programs on physical machines. For example, in some implementations VRR FE-m 110 (or other VRR FEs 110) may be a physical load balancer.

System 100 may generate multiple VRR FEs 110 including a master, successor and eligible successors. A master VRR FE-m 110 may be designated to manage and hold information in memory for the front end application while a successor VRR FE-s 110 may mirror the data controlled by the master VRR FE-m 110. VRR FE-m 110 (and VRR FE-s 110) may track the sequence numbers for a multitude of sessions that are handled on by the other VRR FEs 110. Additional VRR FEs 110 may include nodes selected from a pool of VRR FEs 110 that are neither designated as the master nor the successor. A particular VRR FE-e 110 may become the successor VRR FE-s 110 (i.e., be designated as and assume the functions of) in instances in which the master VRR FE-m 110 stops functioning and the current VRR FE-s 110 takes over the function of the master VRR FE-m 110.

At block 830, system 100 may implement application sessions (e.g., a BGP/TCP session) via VRR FEs 110, back end work units 120, RIBs 140 and other components of system 100 as required. For example, networking architecture 110 may execute a routing protocol for the application.

At block 840, system 100 may store current information regarding sessions handled by components of system 100. System 100 may perform TCP sequence number synchronization between the master VRR FE-m 110 and successor VRR FE-s 110. System 100 may store data for session state and routing state. Back end work units 120 (e.g., BGP speakers) may write to corresponding RIB 140 (e.g., HUB1 session state database). The session manager database may be replicated as with other elements of system 100 so that the elements will be backed up in case of failure. System 100 may be designed with redundancy of elements to protect the resiliency of the system and BGP sessions. In instances that a component goes down another component may seamlessly takes its place.

At block 850, system 100 (e.g., administration process component 180) may monitor the load between VRR FEs 110 and back end work units 110 and determine instances in which more containers are to be generated to handle increasing load. VRR FE-m 110 may request instructions for mapping a particular number of sessions to the current allotment of back end work units 120 (or speaker instances).

In instances in which load increases system 100 may generate additional back end work units (e.g., system 100 may spin up Context 1 speaker N plus 1) at block 860. System 100 may allow for the system to grow horizontally as required based on the load. System 100 may load share to the additional back end work unit 120. The newly generated back end work unit 120 may use the same databases and take on (or receive) session from the previous back end work units 120 to load distributed (or scale out) the increased load. System 100 may allow decoupling of BGP session from TCP session. System 100 may create an end to end relationship in which a number of available TCP sessions may be used by a number of BGP sessions independent of the number of (and any particular) TCP sessions. From a far end perspective, there is a one to one mapping of TCP session to BGP sessions.

According to an embodiment, system 100 may receive notification of a decreased load. System 100 may assign the decreased load to a subgroup of back end work units 120. System 100 may delete back end work units 120 that are not included in the subgroup.

At block 870, system 100 may activate a resiliency mechanism in response to (the detection of) failure of any components of the system 100. System 100 may move data from one to another node within a data center. In instances in which a TCP timeout or IGP adjacency loss occurs, the resiliency mechanism may ensure that the BGP session is not lost. Back end work units 120 and the master VRR FE-m 110 may ensure that routes are not withdrawn and the session is not declared down. System 100 may avoid needing to go through initialization and handshake before route updates are allowed.

In instances in which a particular back end work unit 120 that executes a particular BGP process stops functioning or becomes unreachable, a master control process in system 100 may generate another component (i.e., back end work unit 120) in place of the no longer functional back end work unit 120. The master control process may identify the particular BGP session to continue. The master control process may retrieve session state information from the session state database and routing information from the routing information base (RIB 140). In instances in which a TCP session stops functioning, transport from other TCP session may be able used to handle that process until another new transport session (TCP) session is initiated.

System 100 may access the sequence number associated with the particular BGP session (or other session) based on acknowledgement ("acks") of the last sequence number received. System 100 may thereby determine an amount of content that has been processed on the other end (i.e., by the foreign client). In instances in which the packet ACK is not equal the last sequence number sent, system 100 (i.e., the router) may retransmit the data. The independent tracking of the nodes and sequence number prevents the sending of invalid sequence numbers to the far end session. This prevents the far end session from closing out and the BGP session from going down and eliminating the need to restart the sessions and disrupting seamless BGP routing.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:

receiving a request to provide at least one application session;

generating, by the computer device and based on receiving the request, a networking architecture that includes at least one virtual route reflector front end (VRR FE), at least one back end work unit, and at least one routing information base (RIB) in a virtualization environment, wherein generating the networking architecture includes generating a number of components needed to service the at least one application session;

implementing the at least one application session via the at least one VRR FE, the at least one back end work unit, and the at least one RIB, wherein the at least one VRR FE is to perform as a proxy for traffic to the at least one back end work unit;

monitoring a load associated with the at least one application session;

performing load balancing on the networking architecture based on assignment of the load to the at least one back end work unit;

detecting that a particular component has stopped functioning;

identifying the at least one application session associated with the particular component retrieving session state information associated with the particular component from a session state database;

retrieving routing information associated with the particular component from the RIB; and transferring the at least one application session to another component based on the session state information and the routing information.

2. The method of claim 1, wherein generating the networking architecture further comprises:
generating at least one of a border gateway protocol (BGP) processes component, a central processes component, a shared routing database or an administration processes component.

3. The method of claim 1, wherein the at least one application session includes at least one of a border gateway protocol (BGP) session or a transmission control protocol (TCP) session.

4. The method of claim 1, wherein the at least one VRR FE includes a master VRR FE, a successor VRR FE and at least one eligible successor VRR FE.

5. The method of claim 1, wherein implementing the at least one application session further comprises:
implementing the at least one application session based on an n:n border gateway protocol (BGP) session to transmission control protocol (TCP) session pairing.

6. The method of claim 1, wherein implementing the at least one application session via the at least one back end work unit further comprises:
performing at least one of handling an application, per-session input/output (I/O), or encapsulation/decapsulation for an overlay network.

7. The method of claim 1, wherein implementing the at least one application session via the at least one back end work unit further comprises:
performing at least one of communication with central processes, read/write (R/W) of shared memories, or R/W of persistent data.

8. The method of claim 1, wherein performing load balancing on the networking architecture further comprises:
receiving notification of an increased load;
generating one or more additional back end work units based on the notification of the increased load; and
assigning the increased load across the at least one back end work unit and the additional back end work units.

9. The method of claim 1, wherein performing load balancing on the networking architecture further comprises:
receiving notification of a decreased load across the at least one back end work unit;
reassigning the decreased load to a subgroup of the at least one back end work unit; and
deleting back end work units of the at least one back end work unit that are not included in the subgroup.

10. A computer device comprising:
a memory; and
a processor configured to:
receive a request to provide at least one application session;
generate, based on receiving the request, a networking architecture that includes at least one virtual route reflector front end (VRR FE), at least one back end work unit, and at least one routing information base (RIB) in a virtualization environment, wherein, when generating the networking architecture, the processor is configured to generate a number of components needed to service the at least one application session;
implement the at least one application session via the at least one VRR FE, the at least one back end work unit, and the at least one RIB, wherein the at least one VRR FE is to proxy traffic to the at least one back end work unit;
monitor a load associated with the at least one application session;
perform load balancing on the networking architecture based on assignment of the load to the at least one back end work unit;
detect that a particular component has stopped functioning;
identify the at least one application session associated with the particular component;
retrieve session state information associated with the particular component from a session state database;
retrieve routing information associated with the particular component from the RIB; and
transfer the at least one application session to another component based on the session state information and the routing information.

11. The computer device of claim 10, wherein when generating the networking architecture, the processor is further configured to:
generate at least one of a border gateway protocol (BGP) processes component, a central processes component, a shared routing database or an administration processes component.

12. The computer device of claim 10, wherein the at least one application session includes at least one of a border gateway protocol (BGP) session or a transmission control protocol (TCP) session.

13. The computer device of claim 10, wherein the at least one VRR FE includes a master VRR FE, a successor VRR FE and at least one eligible successor VRR FE.

14. The computer device of claim 10, wherein, when implementing the at least one application session, the processor is further configured to:
implement the at least one application session based on an n:n border gateway protocol (BGP) session to transmission control protocol (TCP) session pairing.

15. The computer device of claim 10, wherein, when implementing the at least one application session via the at least one back end work unit, the processor is further configured to:

perform at least one of communication with central processes, read/write (R/W) of shared memories, or R/W of persistent data.

16. A non-transitory computer-readable memory device storing instructions executable by a processor, the non-transitory computer-readable memory device comprising:
one or more instructions to receive a request to provide at least one application session;
one or more instructions to generate, based on receiving the request, a networking architecture that includes at least one virtual route reflector front end (VRR FE), at least one back end work unit, and at least one application-wide shared memory instance in a virtualization environment, wherein the one or more instructions to generate the networking architecture include one or more instructions to generate a number of components needed to service the at least one application session;
one or more instructions to implement the at least one application session via the at least one VRR FE, the at least one back end work unit, and the at least one application-wide shared memory instance, wherein the at least one VRR FE is to perform as a proxy for traffic to the at least one back end work unit;
one or more instructions to monitor a load associated with the at least one application session;
one or more instructions to perform load balancing on the networking architecture based on assignment of the load to the at least one back end work unit;
one or more instructions to detect that a particular component has stopped functioning;
one or more instructions to identify the at least one application session associated with the particular component;
one or more instructions to retrieve session state information associated with the particular component from a session state database;
one or more instructions to retrieve routing information associated with a particular component from the at least one application-wide shared memory instance; and
one or more instructions to transfer the at least one application session to another component based on the session state information and the routing information.

17. The non-transitory computer-readable memory device of claim 16, wherein the one or more instructions to generate the networking architecture further comprise:
one or more instructions to generate at least one of a border gateway protocol (BGP) processes component, a central processes component, a shared routing database or an administration processes component.

18. The non-transitory computer-readable memory device of claim 16, wherein the at least one application session includes at least one of a border gateway protocol (BGP) session or a transmission control protocol (TCP) session.

19. The non-transitory computer-readable memory device of claim 16, wherein the at least one VRR FE includes a master VRR FE and at least one eligible successor VRR FE.

20. The non-transitory computer-readable memory device of claim 16, wherein the one or more instructions to implement the at least one application session further comprises:
one or more instructions to implement the at least one application session based on an n:n border gateway protocol (BGP) session to transmission control protocol (TCP) session pairing.

* * * * *